July 15, 1952   C. H. O. BERG   2,603,306
ADSORPTION PROCESS AND APPARATUS
Filed Feb. 14, 1949
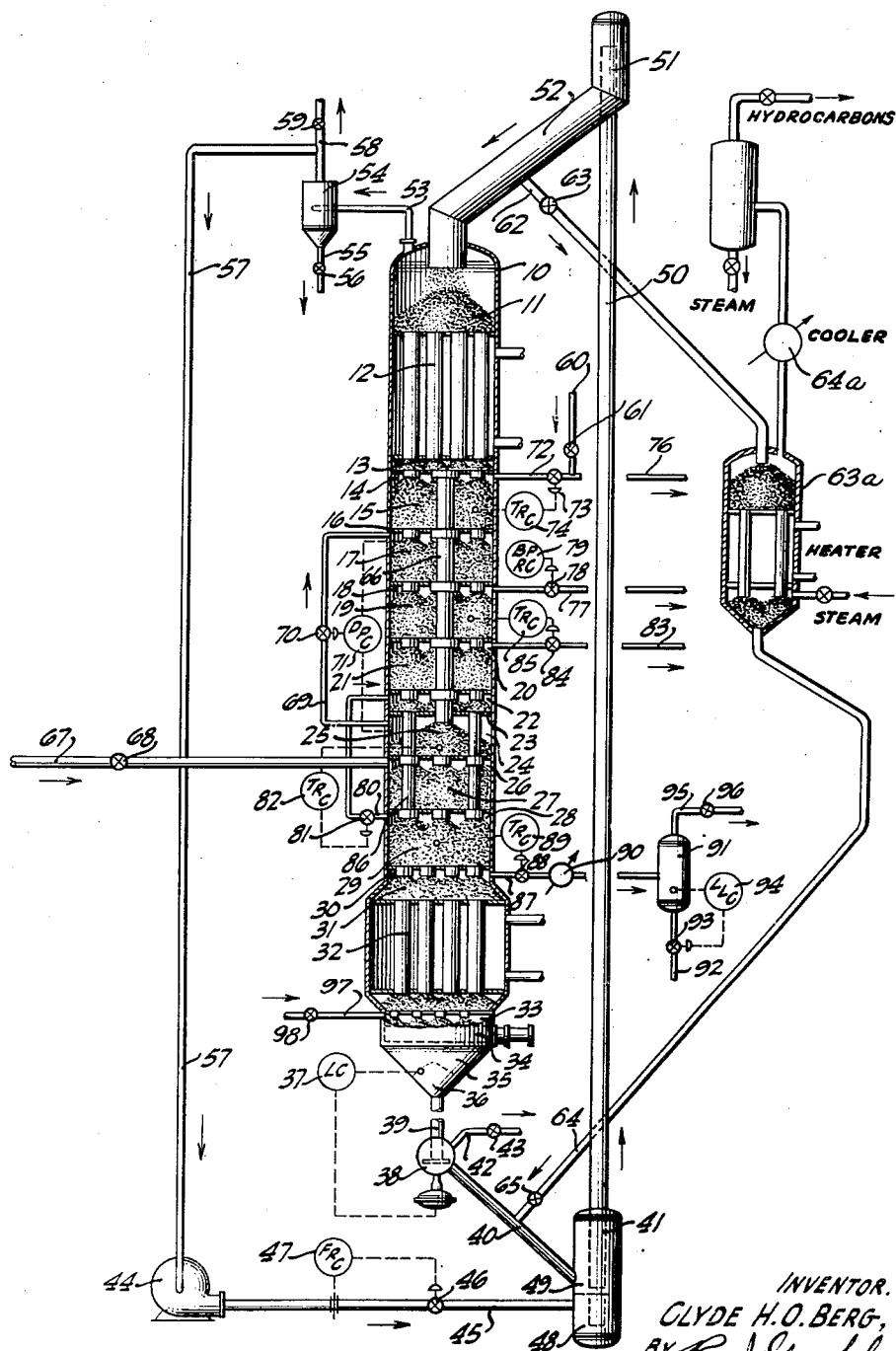
INVENTOR.
CLYDE H. O. BERG,
BY Ross J. Garofalo
ATTORNEY Patented July 15, 1952

2,603,306

UNITED STATES PATENT OFFICE 2,603,306

ADSORPTION PROCESS AND APPARATUS

Clyde H. O. Berg, Long Beach, Calif., assignor to Union Oil Company of California, Los Angeles, Calif., a corporation of California Application February 14, 1949, Serial No. 76,312

27 Claims. (Cl. 183—4.2)

This invention relates to a process and apparatus for the continuous separation of normally gaseous mixtures by selective adsorption of certain constituents of such mixtures on solid granular adsorbents and further relates to a method of control of such a process. The invention applies particularly to the separation of said gaseous mixtures by selective adsorption on granular charcoal into a plurality of fractions including two heart cuts of extreme purity.

The separation of a light gaseous mixture into its constituent parts by the process of selective adsorption offers many advantages over the conventional separation processes of distillation, extraction, etc. In applying the processes of distillation or extraction to the separation of gaseous mixtures containing constituents of relatively low molecular weight, elevated pressures are required together with abnormally low temperatures to condense the gas into a liquid so that it may be separated by these processes. For example, in the preparation of pure ethylene by fractional distillation of ethylene-bearing stocks, a fractionator pressure of 385 pounds per square inch and a reflux temperature of —5° F. are required. In the preparation of pure methane by a similar process a pressure between 500 and 600 pounds per square inch and a reflux temperature of about —150° F. are required. The compression and refrigeration of light gaseous mixtures to permit separation by distillation or extraction are expensive operations and consequently large quantities of gaseous mixtures containing these and other light compounds are often wasted rather than to perform expensive recovery operations.

According to the present invention, the separation of gaseous mixtures by continuous selective adsorption on a granular solid adsorbent involves the steps of countercurrently contacting the gaseous mixture with a moving bed of the adsorbent thereby adsorbing from the mixture those constituents which are more readily adsorbable and leaving as a substantially unadsorbed gas those constituents which are less readily adsorbable. In a moving bed operation the adsorbent, upon which certain of the gaseous constituents have been adsorbed, flows from an adsorption zone into a stripping or desorption zone wherein the adsorbent is heated and contacted with a stripping gas, such as steam, for example, to cause the adsorbed constituents to be liberated. The adsorbent, freed of adsorbed constituents, is subsequently cooled prior to repassage through the adsorption zone. A gaseous mixture may be divided into two separate fractions consisting of a rich gas containing the more readily adsorbable constituents having the higher molecular weight or critical temperature and a lean gas containing the less readily adsorbable constituents having the lower molecular weight or critical temperature. The rich gas is obtained by adsorption and subsequent desorption of the more readily adsorbable constituents and the lean gas is obtained by removal from the adsorption zone of the less readily adsorbable constituents as a substantially unadsorbed gas.

It is to the improvement of the selective adsorption process, especially as applied to the separation of a given gaseous mixture into a plurality of fractions which includes a heart cut or intermediate fraction containing constituents of intermediate adsorbability, that this invention is directed.

It is an object of this invention to provide an improvement in the art of selective adsorption whereby a normally gaseous mixture may be separated into a plurality of fractions including two heart cut fractions of the gaseous mixture in a single selective adsorption column thereby obviating the necessity of employing two selective adsorption columns to obtain equivalent heart cuts.

It is also an object of this invention to provide an improved selective adsorption process for the separation of normally gaseous hydrocarbon mixtures containing constituents which have about six carbon atoms per molecule or less into a plurality of fractions including two intermediate fractions which consist essentially of a particular hydrocarbon constituent or constituents of extreme purity and at a high recovery.

It is a further object of this invention to provide a selective adsorption process of improved efficiency and which has an increased inherent operation simplicity.

Another object of this invention is to provide an improved selective adsorption process for the separation of low molecular weight hydrocarbon gases in which the separation of $C_1$ hydrocarbon from $C_2$ hydrocarbons is facilitated by the absence of $C_3$ hydrocarbons.

An additional object of this invention is to provide a process for the separation of $C_2$ hydrocarbons from $C_3$ hydrocarbons improved by the presence of $C_1$ hydrocarbon in the separation zone.

A still further object of this invention is to provide an improved apparatus which is particularly adapted to accomplish the above-mentioned objects.

Other objects and advantages of this invention will become apparent to those skilled in the art as the description thereof proceeds.

Briefly, this invention comprises a process for the separation of gaseous mixtures which contain constituents having varying degrees of adsorbability with respect to a given granular solid adsorbent into a plurality of fractions or individual constituents thereof. The process of this invention comprises contacting the gaseous mixture with a moving bed of the solid granular adsorbent as herein more fully described in such a manner as to permit the production of a plurality of fractions of the gaseous mixture including two intermediate or heart cut fractions which contain constituents of the gaseous mixture of intermediate adsorbability. The process involves a continuous downward flow of a solid granular adsorbent through the column which contains a feed gas or primary separation section and a side cut gas or secondary separation section isolated from each other. The adsorbent flow is divided into two separate streams, one of which is passed into each of the above-mentioned zones and are subsequently combined. The gaseous mixture to be separated is introduced first into the feed gas zone wherein a partial separation is effected and subsequently one of the products from the feed gas section is passed into the side cut gas section wherein this is contacted with a separate stream of adsorbent. By this operating procedure, the gaseous mixture may be separated into four substantially pure fractions, each of which is uncontaminated by constituents normally present in the other fractions. In addition, this invention comprises a selective adsorption apparatus which is particularly adapted to accomplish the separation of normally gaseous mixtures into a plurality of fractions of extreme purity.

Briefly, the present invention comprises an improvement in the process of contacting a gaseous mixture to be separated with a moving bed of adsorbent in which the moving bed is divided into two separate streams which are passed respectively through two separate contacting zones or sections in a single selective adsorption column. The selective adsorption column is provided at a point below the cooling zone with a secondary separation zone containing four separated contact zones and a primary separation zone containing two contact zones. The secondary separation zone is separated from the primary separation zone by a transverse divider across the column which prevents gas or solids flow therethrough except through tubes especially provided for the transfer of solids. One adsorbent stream flows from the cooler directly into the secondary separation zone while the second stream flows from the cooler through and independent of the secondary separation zone via conduits provided for this purpose. The first stream removed from the bottom of the secondary separation zone flows through and independent of the primary separation zone via conduits especially provided for this purpose. The two streams are combined immediately below the primary separation zone. Thus each separation zone is provided with a separate stream of adsorbent from the cooler, each stream being passed through the other zone in heat transfer relationship therewith through conduits.

A gaseous mixture containing four constituents, for example, is introduced directly into the primary separation zone in which the two most readily adsorbable constituents are adsorbed leaving the two less readily adsorbable constituents unadsorbed as a secondary feed gas. This gas is introduced from the primary separation zone into the secondary separation zone to be contacted by a separate stream of adsorbent and separated into its two constituents in substantially pure form. The two most readily adsorbable constituents, adsorbed on the adsorbent in the primary separation zone, are separated completely by introducing a portion of these constituents desorbed from the adsorbent in the secondary rectification zone into the bottom of the secondary separation zone wherein the heavier of these constituents is adsorbed. The lighter constituent remains unadsorbed and is removed as a second side cut gas product. The heavier constituent passes with the adsorbent from the secondary separation zone through and independent of the primary separation zone through the secondary rectification zone and into the heating zone. The adsorbent is heated by indirect heating and directly contacted by a stripping gas and the adsorbed constituents are thereby removed as the rich gas product. The lean hot adsorbent is conveyed from the bottom of the selective adsorption column to the top wherein it is passed through a tubular cooler. The cooled lean charcoal is then divided and passed through the two above-mentioned separation zones as described.

The present invention also comprises a process as particularly applied to the separation of gaseous mixtures containing predominantly hydrogen and normally gaseous hydrocarbons having about four carbon atoms per molecule or less. It has now been found that the separation of $C_3$ hydrocarbons from $C_2$ hydrocarbons on an activated charcoal adsorbent is facilitated by the presence of $C_1$ hydrocarbon in the zone of separation. It has also been found that the separation of $C_1$ hydrocarbon from $C_2$ hydrocarbons is deleteriously effected by the presence of $C_3$ hydrocarbons in the separation zone. The process of the present invention as briefly described above, as illustrated in the drawing and as hereinafter more fully described permits an improved separation of $C_1$, $C_2$ and $C_3$ hydrocarbons by causing these separations to take place in light of these findings. By eliminating the $C_3$ hydrocarbons from the zone of $C_1$–$C_2$ hydrocarbons separation, lower adsorbent rates per unit volume of gas separated result and less reflux or desorption gas is required to effect an equivalent desorption of a less readily adsorbable gas. It has been found that in the separation of hydrocarbon gases on activated coconut charcoal the reduction of carbon rate by practicing the findings of this invention approximates 10%, a material advantage when carbon circulation rates of the order of hundreds of tons per hour are employed.

The present invention may be more clearly understood by reference to the accompanying drawing which schematically shows a selective adsorption column improved to permit the separation of a gaseous mixture into four substantially pure fractions including two rectified intermediate or side cut fractions of very high purity.

Referring now more particularly to the drawing, selective adsorption column 10 is provided at successively lower levels therein with hopper 11, indirect cooler 12, adsorbent flow divider zone 13, lean gas disengaging zone 14, secondary adsorption zone 15, secondary feed gas engaging zone 16, first side cut rectification zone 17, first side cut gas disengaging zone 18, second side cut rectification zone 19 which may be also termed "first side cut desorption zone 19", second side cut disengaging zone 20, second side cut desorption zone 21, primary reflux gas engaging zone 22, column divider 23, secondary feed disengaging zone 24, primary adsorption zone 25, feed gas engaging zone 26, primary rectification zone 27, primary reflux gas disengaging zone 28, secondary rectification zone 29, rich gas disengaging zone 30, preferential desorption or steaming zone 31, indirect heating zone or stripper 32, stripping gas engaging zone 33, feeder zone 34, and bottom zone 35. The secondary separation zone from which the side cut gas products are removed and which may be termed a side cut gas zone includes zones 13 to 22, inclusive, and the primary separation zone or feed gas zone includes zones 24 to 28, inclusive. The separate streams of adsorbent are removed from the primary and secondary separation zones, are combined in primary reflux gas disengaging zone 28, and are passed as a single moving bed through secondary rectification zone 29. Herein constituents desorbed in zones 31 and 32 pass and constituents desirably in the rich gas product are adsorbed and retained.

In bottom zone 35 an accumulation of adsorbent 36 is maintained by the cooperative action of level controller 37 and adsorbent flow control valve 38. The adsorbent passes from accumulation 36 through sealing leg 39 and from adsorbent flow control valve 38 via transfer line 40 into induction zone 41. The vent gas comprising a mixture of lift gas and stripping gas is removed from valve 38 via line 42 controlled by valve 43. This vent gas or seal gas prevents contamination of the rich gas product with lift gas or the contamination of the lift gas with stripping gas which is introduced via line 97 controlled by valve 98 into engaging zone 33. A lift gas is introduced under pressure exerted by lift gas blower 44 via line 45 controlled by valve 46 under the action of flow recorder controller 47 into lift gas inlet zone 48 of induction zone 41. The lift gas passes upwardly through solids inlet zone 49, picking up the adsorbent, forming a suspension and passes via lift line 50 into impactless separator 51. Herein the adsorbent suspension is broken and the adsorbent and lift gas pass as substantially independent phases through transfer line 52 to collect in the upper portion of column 10. The lift gas passes from column 10 via line 53 into separator 54 wherein suspended adsorbent fines are separated to be removed via line 55 controlled by valve 56. The fines free lift gas then passes via lift gas return line 57 to the suction inlet of blower 44 for recirculation. Accumulations of lift gas in this cycle are withdrawn continuously via line 58 controlled by valve 59. If desired this gas may be combined with the lean gas product by means of line 60 controlled by valve 61.

During operation, it is desirable to remove accumulations of high molecular weight constituents from the carbon such as are formed by polymerization of acetylene or components such as normally liquid hydrocarbons present in the feed gas. To accomplish this about 5% or so of the carbon circulated by means of line 62 controlled by valve 63 from transfer line 52 and is passed through a high temperature reactivator 63a in which the carbon is contacted with reactivation steam while being heated to a temperature of from 500° F. to 1500° F. or higher. The desorbable materials are removed from the carbon at the lower reactivation temperatures and may be combined with the rich gas product. A preferential water gas reaction occurs at the higher temperatures whereby the high molecular weight nondesorbable hydrocarbons are converted to carbon monoxide and hydrogen leaving the carbon in a reactivated state. It is then combined via line 64 controlled by valve 65 with carbon flowing via transfer line 40 into lift line 50.

The description of the apparatus of this invention and the process involved in separating a gaseous mixture thereby into four substantially pure fractions, including ethylene and propylene concentrates, may be more readily understood from the following description which is in the form of a practical example. Although the example is directed to the separation of hydrocarbon gases, the process is not to be considered as limited only to the separation of such gases since the description is merely an illustration of the operation whereby two rectified and substantially pure heart cut or side cut fractions are obtained.

EXAMPLE

A selective adsorption column 12.0 feet in diameter and designed according to the accompanying drawing utilizes a circulation of activated vegetable charcoal amounting to 330,000 pounds per hour. The charcoal has a mesh size range of 12 to 30. The charcoal circulation is divided into two streams at flow divider zone 13 and 230,000 pounds per hour pass directly into secondary adsorption zone 15 for passage through the secondary separation zone and the remaining 100,000 pounds per hour pass downwardly through and independent of the secondary separation zone through conduit 66 for introduction into primary adsorption zone 25 and subsequently through the primary separation zone. The feed gas, a cracked petroleum hydrocarbon gas mixture flowing at a rate of 2141 pound mols per hour, has the following composition:

*Table 1*

FEED GAS COMPOSITION

| Constituent | Mol Per Cent |
|---|---|
| Hydrogen | 17.86 |
| Methane | 40.11 |
| Ethylene | 9.15 |
| Ethane | 24.88 |
| Propylene | 2.42 |
| Propane | 4.13 |
| Butenes | 0.34 |
| Butanes | 0.65 |
| $C_5$'s | 0.21 |
| $C_6+$ | 0.25 |
| Total | 100.00 |

The feed gas is introduced at a pressure of 150 pounds per square inch gauge via line 67 at a rate controlled by valve 68 into feed gas engaging zone 26. It contacts 100,000 pounds per hour of activated carbon in primary adsorption zone 25 wherein the $C_3$ and higher molecular weight hydrocarbons are adsorbed together with a small proportion of $C_2$ and lower molecular weight hydrocarbons to form a rich charcoal. In primary adsorption zone 25 a $C_2$—$C_3$ separation is made in the presence of $C_1$ hydrocarbon which has been found to facilitate the separation by reducing the charcoal rate required. The $C_2$ and lower molecular weight constitutents remain substantially unadsorbed and are removed from secondary feed disengaging zone 24 and passed via line 69 controlled by valve 70 into secondary feed engaging zone 16 in the secondary separation section. The treatment of the rich charcoal formed in primary adsorption zone 25 will be subsequently described.

Valve 70 controlling the rate of secondary feed introduction is actuated by differential pressure controller 71 to maintain a constant differential pressure between disengaging zone 24 and engaging zone 16. The secondary feed, comprising substantially all the $C_2$ and lower molecular weight constituents, is countercurrently contacted by 230,000 pounds per hour of carbon in secondary adsorption zone 15. The $C_1$—$C_2$ hydrocarbon separation is effected here in the absence of the $C_3$ hydrocarbons which were adsorbed and removed from the gas stream during passage through primary adsorption zone 25. The $C_2$ hydrocarbon fraction together with a small quantity of $C_1$ hydrocarbon is adsorbed in secondary adsorption zone 15 to form a second rich charcoal and the major proportion of hydrogen and $C_1$ hydrocarbon is substantially unadsorbed. This gas accumulates in lean gas disengaging zone 14 and a lean gas product stream is removed therefrom via line 72 at a rate controlled by valve 73 which in turn is actuated by temperature recorder controller 74 having thermocouple point 75 in contact with the adsorbent in zone 15. The lean gas product flows at a rate of 1241 pound mols per hour, is sent to storage or further processing facilities not shown by means of line 76, and has the composition given below:

*Table 2*
LEAN GAS PRODUCT COMPOSITION

| Constituent | Mol Per Cent |
|---|---|
| Hydrogen | 30.81 |
| Methane | 69.03 |
| Ethylene | 0.06 |
| Ethane | 0.10 |
| Total | 100.00 |

If desired, a $H_2$—$C_1$ separation can be made in secondary adsorption zone 15 whereby the lean gas product comprises substantially pure hydrogen. Such a separation requires a higher charcoal rates in the secondary separation zone since the $C_1$ hydrocarbon is adsorbed along with the $C_2$ hydrocarbons from the hydrogen.

A portion of the unadsorbed gas passes upwardly from lean gas disengaging zone 14 through the tubes of cooling zone 12, saturating the cooled lean adsorbent therein with constituents of the lean gas product and desorbing traces of stripping gas remaining adsorbed on the adsorbent. This gas flow is termed the "purge gas" and collects in the upper portion of selective adsorption column 10 to be combined with the recirculating lift gas. The composition of the lift gas under these conditions approximates 70% hydrogen and 30% methane which may be produced as a product gas if desired.

The second rich charcoal formed in secondary adsorption zone 15 passes downwardly into first side cut rectification zone 17. Herein the charcoal is contacted with a reflux gas comprising substantially pure $C_2$ hydrocarbons. A preferential desorption of adsorbed $C_1$ hydrocarbon results, the desorbed $C_1$ hydrocarbon passing upwardly to combine with the lean gas product and a second partially rectified charcoal substantially free of $C_1$ and lower molecular weight constituents is formed. This charcoal passes downwardly into second side cut rectification zone 19 wherein the second partially rectified charcoal is contacted by a countercurrent flow of $C_3$ hydrocarbon reflux. The preferential desorption of $C_2$ hydrocarbons by the $C_3$ hydrocarbons is herein effected. Part of the $C_2$ hydrocarbons are employed as above described as the $C_2$ reflux in first side cut rectification zone 17 and are eventually removed from first side cut disengaging zone 18 via line 77 controlled by valve 78 in turn regulated by back pressure recorder controller 79. The first side cut gas product passes via line 77 at a rate of 730 pound mols per hour to further processing facilities or storage not shown and has the following composition:

*Table 3*
FIRST SIDE CUT GAS COMPOSITION

| Constituent | Mol Per Cent |
|---|---|
| Methane | 0.29 |
| Ethylene | 26.74 |
| Ethane | 72.77 |
| Propylene | 0.09 |
| Propane | 0.11 |
| Total | 100.00 |

The charcoal in second side cut rectification zone 19, from which the $C_2$ hydrocarbons have been desorbed and which contains only $C_3$ hydrocarbons substantially uncontaminated by higher or lower molecular weight constituents, passes downwardly into second side cut desorption zone 21. A primary reflux gas containing $C_3$ and $C_4$ hydrocarbon constituents formed in secondary rectification zone 29 as hereinbelow more fully described, passes via line 80 at a rate controlled by valve 81 and actuated by temperature recorder controller 82 is introduced into primary reflux gas engaging zone 22. This gas passes upwardly countercurrent to the partially rectified charcoal present in second side cut desorption zone 21 to preferentially desorb the $C_3$ constituents while adsorbing the $C_4$ hydrocarbon constituents. The thus desorbed $C_3$'s are partially employed as the aforementioned $C_3$ reflux in second side cut rectification zone 19 and the remainder is removed from second side cut disengaging zone 20 via line 83 at a rate controlled by valve 84 and temperature recorder controller 85 at a rate of 140 pound mols per hour. This second side cut gas product has the following composition:

*Table 4*
SECOND SIDE CUT GAS COMPOSITION

| Constituent | Mol Per Cent |
|---|---|
| Ethylene | 0.07 |
| Ethane | 0.13 |
| Propylene | 36.66 |
| Propane | 62.64 |
| Butenes | 0.20 |
| $C_4$'s | 0.30 |
| Total | 100.00 |

The second rectified charcoal, substantially saturated with $C_4$ and higher molecular weight hydrocarbons and substantially free of $C_3$ hydrocarbons, passes downwardly through primary reflux gas engaging zone 22, through and independent of the primary separation zone via conduits 86, and into secondary rectification zone 29 wherein it is combined with charcoal flowing through primary reflux gas disengaging zone 28 from the primary separation zone.

The rich charcoal present in primary adsorption zone 25 contains $C_3$ and higher molecular weight hydrocarbons together with a small proportion of $C_2$ and lighter constituents. It passes into primary rectification zone 27 wherein the charcoal is contacted by a countercurrent flow of part of the aforementioned primary reflux gas. The $C_2$ and lighter molecular weight constituents are preferentially desorbed to form a first partially rectified charcoal. This charcoal is combined with that removed from the bottom of the secondary separation zone and introduced directly into secondary rectification zone 29. Herein the partially rectified carbon is contacted with a countercurrent reflux gas containing $C_4$ and higher molecular weight hydrocarbons. A preferential desorption of substantially all of the $C_3$ hydrocarbons is effected forming a gas containing $C_3$ hydrocarbons as the lowest molecular weight constituents and also containing some $C_4$ and higher molecular weight constituents. This gas is the primary reflux gas which is employed as above described. The rectified charcoal removed from the bottom of secondary rectification zone 29 passes into preferential desorption zone or steaming zone 31. Herein the rectified charcoal is contacted with a countercurrent flow of steam which is preferentially adsorbed at the temperature of the carbon causing an immediate desorption of the major proportion of the $C_4$ hydrocarbon constituents as well as a partial desorption of the higher molecular weight constituents. The desorbed gases are partly introduced into secondary rectification zone 29 as reflux to be preferentially adsorbed therein while the remainder is removed via line 87 controlled by valve 88 which in turn is actuated by temperature recorder controller 89. The rich gas is introduced into cooler 90 wherein the stripping steam is condensed. The condensate is separated from the cooled rich gas in separator 91 from which it is removed via line 92 controlled by valve 93 under action of liquid level controller 94. The rich gas product from which the major proportion of stripping gas has been removed passes from separator 91 via line 95 controlled by valve 96.

Leaving this rich gas for the moment, the partially stripped charcoal saturated with stripping steam passes from preferential desorption zone 31 downwardly through the tubes of indirect heater 32 through which an upward flow of stripping gas is maintained. The temperature to which the carbon is heated during passage through stripper 32 is between 500° F. and 600° F. However, it is insufficient to remove adsorbed $C_5$ and $C_6$ hydrocarbons adsorbed on the carbon. To effect the removal of these higher molecular weight hydrocarbons and to reactivate the carbon by removing traces of nondesorbable constituents, a small portion of the circulating charcoal stream is conveyed through a reactivator described above. The steam plus desorbed hydrocarbons removed from the reactivator are passed through a cooler 64a in much the same way as the rich gas removed from the stripper 32. Hydrocarbon constituents are thus separated from the stripping gas by condensation and/or decantation and are combined with the rich gas removed via line 95 from separator 91. The combination of the thus desorbed higher molecular weight hydrocarbons comprises the rich gas product in this particular operation. These constituents are produced at the rate of 30 pound mols per hour and have the following composition:

Table 5
RICH GAS PRODUCT COMPOSITION

| Constituent | Mol Per cent |
|---|---|
| $C_3$'s | 0.20 |
| $C_4$'s | 66.74 |
| $C_5$'s | 15.18 |
| $C_6+$ | 17.88 |
| Total | 100.00 |

The lean gas product contains only 0.16% impurities and comprises 99.84% of a mixture of hydrogen and methane. The first side cut is a 99.51% pure $C_2$ hydrocarbons consisting approximately of 25% ethylene and 75% ethane. Side cut No. 2 comprises a 99.30% pure $C_3$ hydrocarbon fraction containing over 30% propylene. The unusually high purity of these fractions is attributed to the manner in which they are separated from the feed gas, the separation of $C_1$ from $C_2$ hydrocarbon in the absence of $C_3$ hydrocarbons and the separation of $C_2$ and $C_3$ hydrocarbons in the absence of $C_1$ hydrocarbon.

As an example of conventional operation in the separation of this gaseous mixture wherein the $C_3$ and $C_4$ hydrocarbons are separated as a rich gas, the $C_2$ hydrocarbons are separated as a single side cut gas and the $C_1$ and hydrogen are separated as a lean gas product, a charcoal rate of between 360,000 and 370,000 pounds per hour is required. Thus the improved separation by means of the process above described is at once apparent.

It is to be understood, however, that the specific separations of hydrocarbon gas mixtures used in the two previous examples, is used here only in the purposes of clear description and that this invention of an improved apparatus and process for the separation by selective adsorption of gaseous mixtures applies equally well to other hydrocarbon or nonhydrocarbon gaseous mixtures.

For application to the selective adsorption process as herein described, granular adsorbents ranging from 10 to 14 mesh in size is preferred. However, other ranges of particle size are applicable. In some specific applications, granules as large as about two mesh are applicable and in certain other specific instances powdered adsorbents may be applied having small granules as fine as about 100 mesh or finer may be used. Of the various adsorbents which are applicable for use in the selective adsorption process as herein described, I prefer to employ activated granular charcoal and particularly an activated vegetable charcoal with granules of from 10 to 14 mesh in size, although other adsorbents such as silica gel, activated aluminum oxide, activated bauxite, animal and mineral carbons, and various adsorbents prepared from iron and chromium oxides, and other adsorbents are applicable.

In the description of the improved selective adsorption apparatus the adsorbent was conveyed from the lower portion of the selective adsorption column to the upper portion thereof by means of a gas lift employing a fraction of the lean gas produced in the process. In certain instances other typical means of conveying granular solids may be employed such as the utilization of elevator means positioned in a proper housing so as to withstand the pressure of operation. The utilization of a gas lift, however, is preferred in view of certain difficulties of maintenance and operation of elevators at elevated pressures.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the separation of a gaseous mixture into four substantially uncontaminated fractions which comprises contacting said gaseous mixture with a first moving bed of solid granular adsorbent in a feed gas zone to adsorb at least two of the more readily adsorbable constituents leaving at least two of the less readily adsorbable constituents substantially unadsorbed, passing said unadsorbed constituents as a secondary feed gas from said feed gas zone to a side cut gas zone, contacting said secondary feed gas with a second moving bed of solid granular adsorbent to adsorb part thereof leaving the least readily adsorbable constituent of said gaseous mixture substantially unadsorbed as a lean gas product, subsequently desorbing the adsorbed part of said secondary feed in substantially pure form as a first side cut gas product, desorbing a portion of the more readily adsorbable constituents from said first moving bed of adsorbent as a primary reflux gas, passing said primary reflux gas into said side cut gas zone, adsorbing the most readily adsorbable constituents leaving less readily adsorbable constituents substantially unadsorbed as a second side cut gas product, combining said first and second moving bed of solid granular adsorbent removed from said feed gas and said side cut gas zones, respectively, and indirectly heating the combined adsorbent while contacting the same with a countercurrent flow of stripping gas to desorb the most readily adsorbable constituents therefrom as a rich gas product in substantially pure form.

2. A process for the separation of a gaseous mixture into four substantially pure parts which comprises passing one stream of a solid adsorbent successively through a secondary adsorption zone, a first side cut rectification zone, a first side cut desorption zone and a second side cut desorption zone, passing a second stream of solid adsorbent successively through a primary adsorption zone and a primary rectification zone, introducing said gaseous mixture into said primary adsorption zone, removing a substantially unadsorbed secondary feed from said primary adsorption zone, introducing said secondary feed into said secondary adsorption zone, removing a lean gas product comprising substantially unadsorbed gas from said secondary adsorption zone, removing a first side cut gas product containing constituents more readily adsorbable than said lean gas product from said first side cut gas desorption zone, removing a second side cut gas product containing constituents more readily adsorbable than said first side cut gas product from said second side cut gas desorption zone, passing a primary reflux gas from a secondary rectification zone to said second side cut gas desorption zone, combining said separate adsorbent streams in said secondary rectification zone, stripping the remaining adsorbed gas from the combined adsorbent in a stripping zone, and removing the most readily adsorbable constituents as a rich gas product from said stripping zone.

3. A process according to claim 2 wherein said stripping is carried out by the use of heat and a stripping gas.

4. A process for the separation of a gaseous mixture which comprises passing separate and independent streams of solid granular adsorbent through a primary separation zone and a secondary separation zone, combining the adsorbent withdrawn from said zones, and passing it through a secondary rectification zone and a stripping zone successively, introducing said gaseous mixture into said primary separation zone to adsorb at least two of the more readily adsorbable constituents leaving at least two of the less readily adsorbable constituents substantially unadsorbed as a secondary feed gas, passing said secondary feed gas into said secondary separation zone, removing the least readily adsorbable constituent as a lean gas product from said secondary separation zone, removing the next less readily adsorbable constituent in said secondary feed gas from said secondary separation zone as a first side cut product, stripping the combined streams of adsorbent in the stripping zone to desorb the most readily adsorbable constituents as a rich gas product, desorbing a primary reflux gas from combined streams of adsorbent in said secondary rectification zone, said reflux gas containing constituents of the rich gas, introducing said primary reflux into said secondary separation zone, and removing unadsorbed constituents thereof as a second side cut gas product.

5. A process according to claim 1 wherein said granular adsorbent comprises activated charcoal and said stripping gas comprises steam.

6. A process according to claim 4 wherein a moving bed of granular adsorbent introduced into said primary separation zone is passed through and independently of said secondary separation zone in heat transfer relationship therewith.

7. A process according to claim 4 wherein a moving bed of solid granular adsorbent passing through said secondary separation zone is removed therefrom and passed through and independently of said primary separation zone in heat transfer relationship therewith.

8. A process for the separation of hydrocarbon gases containing four carbon atoms or less which comprises contacting the gaseous mixture with a first moving bed of solid granular adsorbent to adsorb $C_3$ and higher molecular weight hydrocarbons from $C_2$ and lower molecular weight hydrocarbons in the presence of $C_1$ hydrocarbon, contacting the unadsorbed $C_2$ and lower molecular weight hydrocarbons with a separate moving bed of solid granular adsorbent to adsorb $C_2$ hydrocarbons from $C_1$ hydrocarbon and lower molecular weight constituents in the absence of $C_3$ hydrocarbons, desorbing adsorbed $C_3$ hydrocarbons from the first moving bed, and desorbing adsorbed $C_2$ hydrocarbons from the separate moving bed by contacting the separate moving bed with a portion of the $C_3$ hydrocarbons desorbed from the first moving bed.

9. A process for separating a substantially pure hydrocarbon fraction consisting of $C_2$ hydrocarbons from gaseous mixtures thereof containing $C_3$ and $C_4$ hydrocarbons which comprises introducing said feed gas into a primary separation zone, contacting said feed gas with a first moving bed of solid granular adsorbent to adsorb $C_3$ and $C_4$ hydrocarbons from $C_2$ hydrocarbons in the presence of $C_1$ hydrocarbon leaving said $C_2$ and $C_1$ hydrocarbons substantially unadsorbed, passing this unadsorbed gas to a secondary separation zone, contacting said gas with a separate moving bed of solid granular adsorbent as a moving bed to adsorb $C_2$ hydrocarbons from $C_1$ hydrocarbons in the absence of $C_3$ hydrocarbons leaving $C_1$ hydrocarbon substantially unadsorbed, combining the two moving beds for passage through a secondary rectification zone and a stripping zone, stripping $C_4$ hydrocarbons from the adsorbent in the stripping zone, employing a portion of the stripped $C_4$ hydrocarbons as a reflux to desorb $C_3$ hydrocarbons in said secondary rectification zone, and employing a portion of the desorbed $C_3$ hydrocarbons to desorb the adsorbed $C_2$ hydrocarbons from said separate moving bed.

10. A process according to claim 9 wherein said solid granular adsorbent comprises activated charcoal.

11. A process for the separation of a gaseous mixture of hydrocarbons and hydrogen into a plurality of substantially pure fractions including two side cut fractions of intermediate adsorbability which comprises passing a moving bed of solid granular adsorbent downwardly through a cooling zone, dividing the cooled adsorbent into two separate streams, passing one stream through and independently of a secondary separation zone into a primary separation zone, passing the second stream directly into said secondary separation zone, removing adsorbent from said secondary adsorption zone and passing it through and independently from said primary separation zone to be combined in a secondary rectification zone with adsorbent withdrawn from said primary separation zone, combining the two streams in a secondary rectification zone, introducing said gaseous mixture into said primary separation zone to adsorb $C_3$ and higher molecular weight hydrocarbons in the presence of $C_1$ hydrocarbon forming a first rich adsorbent leaving $C_2$ and lower molecular weight constituents substantially unadsorbed, passing said unadsorbed gas to said secondary separation zone therein adsorbing $C_2$ hydrocarbons from $C_1$ hydrocarbon and lower molecular weight constituents in the absence of $C_3$ hydrocarbons, forming a second rich adsorbent, removing $C_1$ hydrocarbon and lower molecular weight constituents as a substantially unadsorbed lean gas from said secondary separation zone, subsequently contacting the second rich adsorbent with a reflux stream of $C_3$ hydrocarbons thereby desorbing a substantially pure fraction of $C_2$ hydrocarbons as a first side cut gas product from said secondary separation zone, then contacting the second rich adsorbent with a reflux stream of $C_3$ and $C_4$ hydrocarbons in said secondary separation zone to adsorb $C_4$ hydrocarbons leaving a substantially pure stream of $C_3$ hydrocarbons as a second side cut gas product, contacting the combined adsorbent stream in said secondary rectification zone with $C_4$ and higher molecular weight hydrocarbons thereby desorbing a primary reflux gas containing $C_3$ and $C_4$ hydrocarbons, introducing a portion of said primary reflux into said secondary separation zone for desorption of said second side cut product, introducing the remaining portion of said primary reflux into said primary separation zone, and subsequently contacting the combined adsorbent stream with a stripping gas while heating to desorb $C_4$ and higher molcecular weight hydrocarbons as a rich gas product substantially free of $C_3$ and lower molecular weight constituents.

12. A process according to claim 4 wherein said solid granular adsorbent comprises activated charcoal.

13. A process for the separation of olefin hydrocarbon concentrates from hydrocarbon gases having constituents with four carbon atoms or less which comprises introducing said gaseous mixture into a feed gas zone, contacting said gaseous mixture with a first moving bed of activated charcoal thereby adsorbing the $C_3$ and $C_4$ hydrocarbons, passing the unadsorbed $C_2$ and lower molecular weight hydrocarbons and hydrogen from said feed gas zone to a side cut gas zone as a secondary feed, contacting the secondary feed with a second moving bed of activated charcoal thereby adsorbing the $C_2$ hydrocarbons leaving $C_1$ hydrocarbon and hydrogen substantially unadsorbed as a lean gas product, combining the first and second moving beds of charcoal removed from said feed gas and side cut gas zone in a secondary rectification zone, desorbing a primary reflux gas containing $C_3$ and some $C_4$ hydrocarbons from said secondary rectification zone, introducing said primary reflux into said side cut gas zone, adsorbing $C_4$ hydrocarbons from said primary reflux leaving a second side cut gas product containing substantial quantities of propylene, employing part of said second side cut gas to desorb a first side cut gas containing substantial quantities of ethylene, and circulating the combined adsorbent through a heating zone and a cooling zone prior to dividing and introducing separate streams into said feed gas and side cut gas zones.

14. A process according to claim 13 wherein a portion of said activated charcoal being introduced into said cooling zone is withdrawn from the cycle and subjected in a regeneration zone to indirect heating to an elevated temperature and a simultaneous countercurrent contact with steam to desorb $C_4$ and higher molecular weight hydrocarbons, removing steam and desorbed hydrocarbons from said regeneration zone, separating steam from said hydrocarbons, and combining the regenerated charcoal with charcoal removed from said heating zone.

15. An apparatus for the separation of a gaseous mixture which comprises a vertical selective adsorption column provided at successively lower levels therein with an adsorbent hopper, an indirect tubular cooler, a secondary separation zone containing a secondary adsorption section, a first side cut rectification section, a second side cut rectification section and a second side cut desorption section, a primary separation zone provided with a primary adsorption section and a primary rectification section, a divider separating said primary and secondary separation sections, a secondary rectification section, a preferential desorption section, an indirect tubular heating section, means for removing adsorbent from the bottom of said column and reintroducing it into the top of said column, means immediately below said cooling section to divide the adsorbent flowing therethrough into two separate streams, means for passing a first fraction of said charcoal through and independently of said secondary separation section into said primary separation section while introducing the remaining portion directly into said secondary separation section, means for removing the second portion of said adsorbent from said secondary separation section by passing it through and independent of said primary separation section, means for combining said first and second portions in said secondary rectification section, means for introducing a feed gas into said primary adsorption section, means for passing a secondary feed gas from said primary adsorption section to said secondary adsorption section, means for removing a lean gas from said secondary adsorption section, means for removing a first side cut gas from said first side cut rectification section, means for removing a second side cut from said second side cut gas rectification section, means for introducing stripping steam at a point below said indirect heating section, means for removing a rich gas product from said preferential desorption section, and means for passing a primary reflux gas from said secondary rectification section to said second side cut gas desorption section.

16. An apparatus according to claim 15 wherein said means for conveying adsorbent from the bottom to the top of said column comprises a sealing leg connected to the bottom of said column, an adsorbent flow control valve connected to the bottom of said sealing leg, means for removing a mixture of stripping steam and lift gas from said control valve, a transfer line connecting said control valve with an induction chamber, a vertical conduit connecting said induction chamber with an impactless separator positioned above the top of said column, a transfer line connecting said separator with the top of said column, a blower for removing lift gas from the top of said column and introducing it under pressure into said induction chamber and means for removing adsorbent fines from the gas drawn by the blower from the top of said column.

17. A process for the separation of a gaseous mixture to obtain first, second, and third fractions having successively greater degrees of adsorbability on a solid adsorbent, which comprises contacting the gaseous mixture with a first stream of solid adsorbent to adsorb the third fraction and leave the first and second fractions substantially unadsorbed, contacting the unadsorbed first and second fractions with a separate stream of solid adsorbent to adsorb the second fraction, withdrawing the unadsorbed first fraction, desorbing the adsorbed third fraction from the first stream, desorbing the adsorbed second fraction from the separate stream of adsorbent by contacting the separate stream with a portion of the third fraction desorbed from the first stream, and separately withdrawing the remainder of the third fraction and the desorbed second fraction.

18. A process for separating a gaseous mixture to obtain first, second, third and fourth fractions of successively greater adsorability on a solid adsorbent, which comprises contacting the gaseous mixture with a first stream of solid adsorbent to adsorb the third and fourth fractions, contacting unadsorbed first and second fractions with a separate stream of solid adsorbent so as to adsorb the second fraction, withdrawing the unadsorbed gas as the first fraction, desorbing the third fraction from the first stream of solid adsorbent, employing a portion of the desorbed third fraction to desorb the second fraction from the separate stream of adsorbent, combining the two streams of adsorbent, stripping the fourth fraction from the combined adsorbent, and separately withdrawing the second, third and fourth fractions.

19. A process for the separation of a gaseous mixture to obtain first, second, third and fourth fractions of successively greater degrees of adsorbability on a solid adsorbent which comprises countercurrently contacting said gaseous mixture with a first stream of solid adsorbent in a primary adsorption zone so as to adsorb said third and fourth fractions and leave unadsorbed first and second fractions, countercurrently contacting the unadsorbed first and second fractions in a secondary adsorption zone with a separate stream of solid adsorbent so as to adsorb the second fraction, withdrawing the unadsorbed first fraction, countercurrently contacting the separate stream of adsorbent withdrawn from the secondary adsorption zone with a second fraction reflux in a first side cut rectification zone to remove any residual first fraction therefrom, countercurrently contacting the separate stream of adsorbent leaving the first side cut rectification zone with a third fraction reflux in a first side cut desorption zone so as to desorb the second fraction therefrom, withdrawing the desorbed second fraction, countercurrently contacting the separate stream of adsorbent leaving the first side cut desorption zone with a primary reflux gas consisting essentially of third fraction contaminated with fourth fraction in a second side cut desorption zone so as to remove the contaminating fourth fraction, withdrawing pure third fraction from the second side cut desorption zone, combining the separate stream of adsorbent leaving the second side cut desorption zone with the first adsorbent stream in a secondary rectification zone, countercurrently contacting the combined adsorbent in the secondary rectification zone with a fourth fraction reflux so as to desorb said primary reflux gas, and stripping the fourth fraction from the remaining adsorbent in a stripping zone.

20. A process according to claim 19 in which a portion of the fourth fraction desorbed in the stripping zone is forced back into the secondary rectification zone as said fourth fraction reflux, a portion of the third fraction is forced back into the first side cut desorption zone as said third fraction reflux, and a portion of the second fraction is forced back into the first side cut rectification zone as said second fraction reflux.

21. A process according to claim 19 in which the first stream of adsorbent is passed from the primary adsorption zone to the secondary rectification zone through a primary rectification zone, and one portion of the primary reflux gas desorbed in the secondary rectification zone is passed into the primary rectification zone as reflux, while the remainder is passed to the second side cut desorption zone as described.

22. A process according to claim 19 in which the solid adsorbent streams are moving beds of granular charcoal, and the stripped charcoal is divided to form the two streams and recirculated.

23. An apparatus for the separation of a gaseous mixture which comprises a vertical adsorption column containing a primary separation zone, a secondary separation zone comprising a secondary adsorption zone and a first side cut desorption zone, and a secondary rectification zone, means for permitting a first stream of granular adsorbent to flow downward by gravity through said primary separation zone, means for permitting a separate stream of granular adsorbent to flow downward by gravity through said secondary separation zone, means for combining the first and separate streams of adsorbent for passage through the secondary rectification zone, means for introducing said gaseous mixture into the primary separation zone, means for transferring a secondary feed gas from the primary separation zone into the secondary adsorption zone, means for transferring a reflux gas from said secondary rectification zone to the first side cut desorption zone, and means for removing a first product fraction and a second product fraction from the secondary adsorption zone and the first side cut desorption zone respectively.

24. An apparatus for the separation of a gaseous mixture which comprises a vertical adsorption column containing a primary separation zone, a secondary separation zone comprising a secondary adsorption zone and a first side cut desorption zone at successively lower levels, a secondary rectification zone, and a stripping zone, means for permitting one stream of granular adsorbent to flow downward by gravity through said primary separation zone, means for permitting a separate stream of granular adsorbent to flow downward by gravity through said secondary separation zone, means for combining the two streams and passing the combined stream of granular adsorbent through the secondary rectification zone and the stripping zone successively, means for introducing the gaseous mixture into the primary separation zone, means for removing a secondary feed gas from the primary separation zone, means for introducing the secondary feed gas into the lower portion of the secondary adsorption zone, means for removing unadsorbed gas from the upper portion of the secondary adsorption zone, means for removing a primary reflux gas from the upper portion of the secondary rectification zone, means for withdrawing one portion of the primary reflux gas, means for introducing another portion of the reflux gas into the lower portion of the first side cut desorption zone, means for removing desorbed gas from the upper portion of the first side cut desorption zone, and means for removing stripped gas from the upper portion of the stripping zone.

25. An apparatus for the separation of a gaseous mixture which comprises a vertical adsorption column containing a primary separation zone comprising a primary adsorption zone and a primary rectification zone at successively lower levels, a secondary separation zone comprising a secondary adsorption zone, a first side cut rectification zone, a first side cut desorption zone, and a second side cut desorption zone at successively lower levels, a secondary rectification zone, and a stripping zone, means for permitting a first stream of granular adsorbent to flow downward by gravity through said primary separation zone, means for permitting a separate stream of granular adsorbent to flow downward by gravity through said secondary separation zone, means for combining the two streams and passing the combined stream of granular adsorbent through the secondary rectification zone and the stripping zone successively, means for introducing the gaseous mixture into the lower portion of the primary adsorption zone, means for transferring unadsorbed secondary feed gas from the upper portion of the primary adsorption zone to the lower portion of the secondary adsorption zone, means for removing unadsorbed gas from the upper portion of the secondary adsorption zone, means for transferring one portion of primary reflux gas from the upper portion of the secondary rectification zone to the lower portion of the primary rectification zone while transferring another portion of the primary reflux gas from the upper portion of the secondary rectification zone to the lower portion of the second side cut desorption zone, means for removing one purified side cut from the upper portion of the second side cut desorption zone, means for removing another purified side cut from the upper portion of the first side cut desorption zone, and means for removing stripped gas from the upper portion of the stripping zone.

26. An apparatus according to claim 25 in which the means for transferring secondary feed gas from the upper portion of the primary adsorption zone to the lower portion of the secondary adsorption zone comprises tubular means external to the column and valvular means for controlling the gas flow through the tubular means.

27. An apparatus according to claim 25 in which the means for transferring primary reflux gas from the upper portion of the secondary rectification zone to the lower portion of the second side cut desorption zone comprises tubular means external to the column and valvular means for controlling the gaseous flow through the tubular means.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,825,707 | Wagner, Jr. | Oct. 6, 1931 |
| 2,376,425 | Frey | May 22, 1945 |
| 2,384,311 | Kearby | Sept. 4, 1945 |
| 2,474,170 | Sulzbacher | June 21, 1949 |
| 2,523,149 | Scheeline | Sept. 19, 1950 |